(12) United States Patent
Huang et al.

(10) Patent No.: US 7,861,044 B2
(45) Date of Patent: Dec. 28, 2010

(54) METHOD FOR ACCESSING MEMORY DATA

(75) Inventors: Wen-Juin Huang, Taipei County (TW); Chung-Ching Huang, Taipei County (TW); Chien-Ping Chung, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 451 days.

(21) Appl. No.: 11/945,311

(22) Filed: Nov. 27, 2007

(65) Prior Publication Data

US 2008/0222345 A1 Sep. 11, 2008

(30) Foreign Application Priority Data

Mar. 7, 2007 (TW) ............................... 96107933 A

(51) Int. Cl.
*G06F 13/00* (2006.01)
*G06F 13/28* (2006.01)
*G06F 13/14* (2006.01)

(52) U.S. Cl. ............................. 711/154; 711/E12.002; 710/305

(58) Field of Classification Search ................. 711/154, 711/E12.002; 710/305
See application file for complete search history.

(56) References Cited

U.S. PATENT DOCUMENTS

| 6,119,192 | A * | 9/2000 | Kao et al. ................. 710/311 |
| 6,963,948 | B1 * | 11/2005 | Gulick ....................... 710/311 |
| 2002/0099893 | A1 * | 7/2002 | Nguyen et al. ............. 710/260 |
| 2002/0156958 | A1 * | 10/2002 | Huang ........................ 710/260 |
| 2003/0041248 | A1 * | 2/2003 | Weber et al. ................ 713/182 |

\* cited by examiner

*Primary Examiner*—Sheng-Jen Tsai
*Assistant Examiner*—Edward J Dudek, Jr.
(74) *Attorney, Agent, or Firm*—Thomas, Kayden, Horstemeyer & Risley

(57) ABSTRACT

A memory access method for accessing data from a non-volatile memory in a south bridge is provided. Memory access is performed under a system management mode (SMM). Under the protection of the SMM mode, the desired memory address is not altered by an interrupt handler, therefore memory data is accessed correctly.

11 Claims, 5 Drawing Sheets

METHOD FOR ACCESSING MEMORY DATA

This application claims the benefit of Taiwan application Serial No. 96107933, filed Mar. 7, 2007, the subject matter of which is incorporated herein by reference.

BACKGROUND OF THE INVENTION

1. Field of the Invention

The invention relates in general to a memory access method, and more particularly to a method for accessing data from a non-volatile memory in a south bridge.

2. Description of the Related Art

For a unified memory architecture (UMA), the VGA software of a computer system needs to call a call-back function when accessing data (such as frame buffer size) from a non-volatile memory (such as a CMOS memory) of a south bridge. Then, the call-back function accesses necessary information from the memory and transmits the information to the VGA software.

However, if an interrupt occurs while the call-back function is accessing the memory, the interrupt handler may accidentally alter the address of the desired memory. If the interrupt handler alters the desired address of the memory, after the interrupt finishes, the call-back function may access data from erroneous address of the memory and result in unexpected results.

FIG. 1 is a flowchart illustrating the occurrence of error in a conventional memory access method. In step 110, an address value is transmitted to an index port (such as 70h port) of the south bridge, and the data is accessed from the address of the memory corresponding to the address value. In step 120, an interrupt occurs. Afterwards, in step 130, the interrupt handler of the interrupt accidentally alters the address value corresponding to the index port as an erroneous address value. In step 140, when the memory is accessed via a data port (such as 71h) of the south bridge according to the address value of the index port, the access is based on an erroneous address value altered by the interrupt handler rather than on the original address value. Therefore, data is accessed from erroneous address of the memory corresponding to the erroneous address value memory, hence resulting in unexpected results.

FIG. 2 is an example corresponding to the error of FIG. 1. The blocks 210, 220 and 230 respectively are the instructions of the VGA software, the call-back function and the interrupt handler. In block 210, the VGA software calls a call-back function. Afterwards, the method proceeds to block 220, the call-back function transmits the address value A0h to an index port 70h of the south bridge. Afterwards, an interrupt occurs. In block 230, the interrupt handler of the interrupt accidentally alters the address value A0h corresponding to the index port 70h as an erroneous address value 0ch. When the interrupt finishes, the method returns to block 220, the call-back function accesses data from the memory via the data port 71h of the south bridge according to the address value of the index port 70h, and the access is based on an erroneous address value 0ch altered by the interrupt handler rather than on the original address value A0h. Therefore, data is accessed from erroneous address 0ch of the memory, not from the desired address A0h.

SUMMARY OF THE INVENTION

The invention is directed to a memory access method is provided. The data of a CMOS memory in a south bridge is accessed under a system management mode (SMM). Under the protection of the SMM mode, the desired memory address is not altered by an interrupt handler, therefore memory data is accessed correctly.

According to a first aspect of the present invention, a memory access method for accessing a memory of a computer system according to a function ID instruction is provided. The function ID instruction comprises a first function ID value and a second function ID value. The computer system comprises a south bridge which comprises a first index port, a first data port and a default I/O port. The memory access method comprises the following steps: Firstly, under the operation of a call-back function, a default value is inputted to a default I/O port according to a function ID instruction, and a system management mode (SMM) is entered. Then, under the SMM mode, an address value corresponding to the first function ID value is inputted to the first index port; meanwhile, a memory access corresponding to the second function ID value is performed on the first data port according to the address value.

According to a second aspect of the present invention, a memory access method for accessing a memory of a computer system according to a function ID instruction is provided. The function ID instruction comprises a first function ID value and a second function ID value. The computer system comprises a general purpose register and a south bridge which comprise a first index port, a second index port, a first data port and a second data port. The memory access method comprises the following steps: Under the operation of a call-back function, an address value corresponding to the first function ID value is inputted to the second index port, and an SMM mode is entered. Afterwards, under the SMM mode, the address value is transferred from the second index port and then stored in the general purpose register. Next, the method returns to the operation of the call-back function, a memory access corresponding to the second function ID value is performed on the second data port according to the address value, and the SMM mode is entered. Lastly, under the SMM mode, the address value stored in the general purpose register is transmitted to the first index port, and a memory access corresponding to the second function ID value is performed on the first data port according to the address value.

According to a third aspect of the present invention, a memory access method for accessing a memory of a computer system according to a function ID instruction is provided. The function ID instruction comprises a first function ID value and a second function ID value. The computer system comprises a south bridge which comprises an index port, a data port and a software system management interrupt (software SMI) port. The memory access method comprises the following steps: Under the operation of a call-back function, an address value corresponding to the first function ID value is stored. Meanwhile, a default value is inputted to the software SMI port according to the second function ID value, and an SMM mode is entered. Afterwards, under the SMM mode, the address value is inputted to the index port; meanwhile, a memory access corresponding to the second function ID value is performed on the data port according to the address value.

The invention will become apparent from the following detailed description of the preferred but non-limiting embodiments. The following description is made with reference to the accompanying drawings.

DETAILED DESCRIPTION OF THE INVENTION

The memory access method of the invention is for accessing a non-volatile memory in a south bridge under a system management mode (SMM). The priority of accessing memory in the SMM mode is higher than any interrupt. That is, there is no interrupt during the access of memory in the SMM mode. Therefore, when a memory is accessed, the desired memory address is not altered by an interrupt handler. If the memory address is altered, data may be accessed from erroneous address of the memory. As interrupt does not occur in the SMM mode, despite the interrupt handler of an interrupt may alter the desired address data, the address data is still correctly transmitted to the index port in the SMM mode, and the data is accessed from correct address of the memory.

The VGA software calls a call-back function when accessing the non-volatile memory in a south bridge such as a CMOS memory. The call-back function will access the memory according to the function ID instruction $I_f$ outputted from the VGA software. The function ID instruction $I_f$ comprises a first function ID value $I_1$ and a second function ID value $I_2$.

The first function ID value $I_1$ and the second function ID value $I_2$ are elaborated below. The first function ID value $I_1$ corresponds to the data that the VGA software desires to access such as the options of the frame buffer size and the output device. For example, when the VGA software desires the frame buffer size, the first function ID value $I_1$ is 1. The first function ID value $I_1$ corresponds to an address value $I_d$ which corresponds to an address of the memory, and the data corresponding to the address of memory is the data of frame buffer size. That is, when the VGA software desires to access the data of frame buffer size from the memory, the VGA software outputs the first function ID value $I_1$ as 1. Then the call-back function will access data from the memory according to an address value $I_d$ corresponding to the first function ID value $I_1$ whose value is 1, and the data corresponding to the address value $I_d$ is the data of frame buffer size.

The second function ID value $I_2$ corresponds to the desired access of the VGA software. For example, when the second function ID value $I_2$ is 1, data is accessed from the memory; when the second function ID value $I_2$ is 2, data is written to the memory.

First Embodiment

Figure 1:
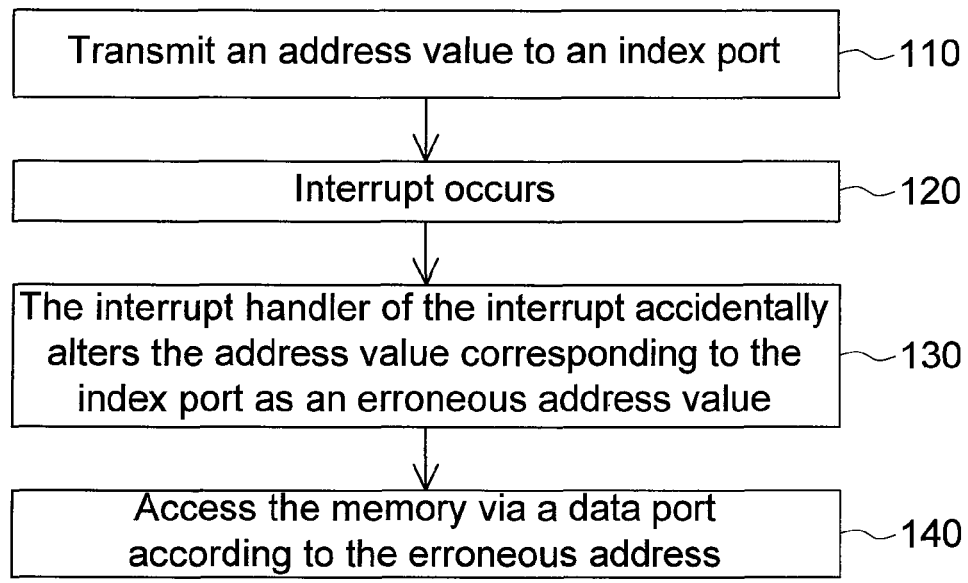
FIG. 1 (Prior Art) is a flowchart illustrating the occurrence of error in a conventional memory access method.
Figure 2:
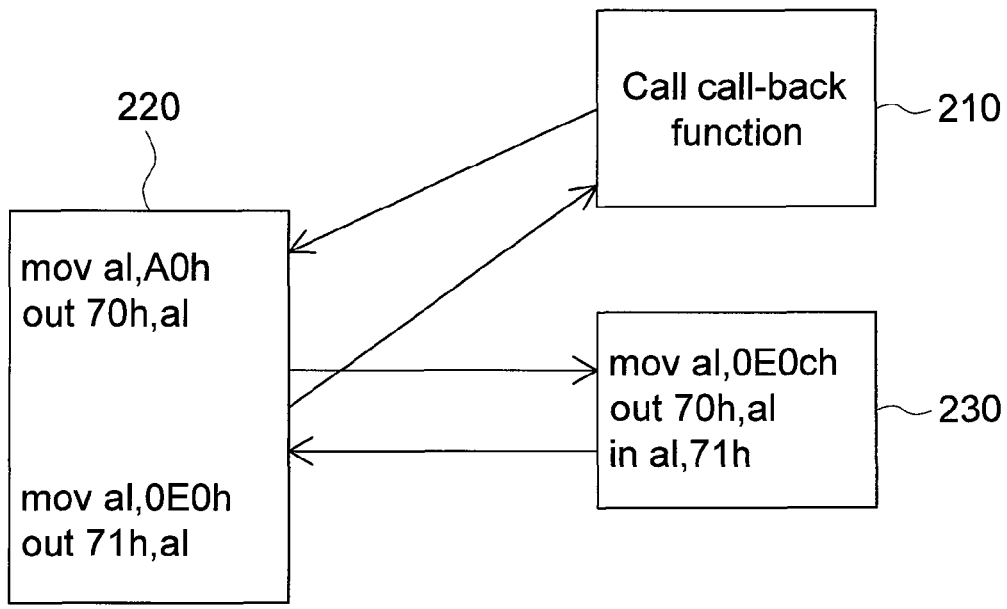
FIG. 2 (Prior Art) is an example corresponding to the error of FIG. 1.
Figure 3:
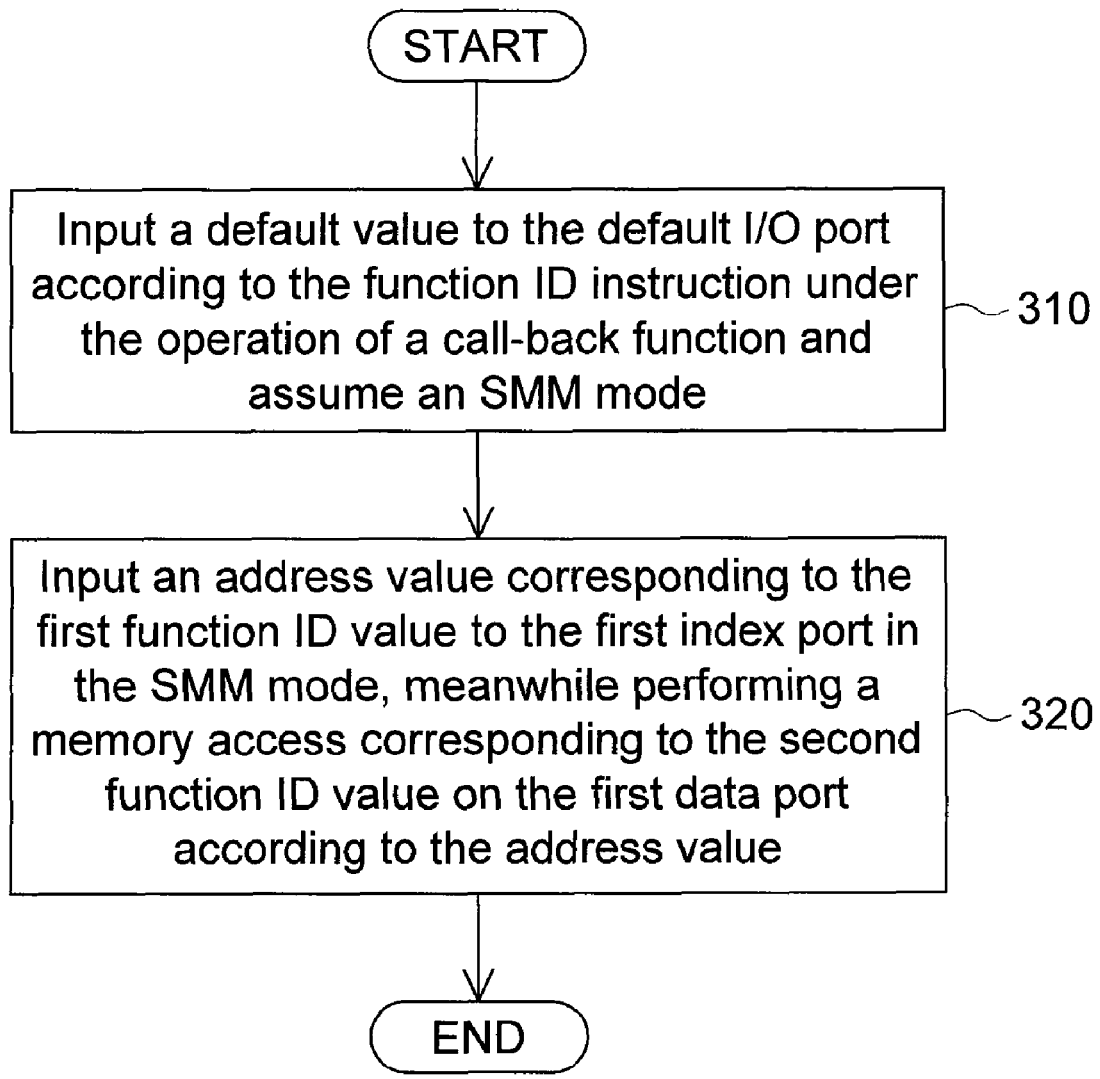
FIG. 3 is a flowchart of a memory access method according to a first embodiment of the invention.

The flow of the memory access method of the first embodiment of the invention is disclosed below. Referring to FIG. 3, a flowchart of a memory access method according to a first embodiment of the invention is shown. Firstly, the method begins at step 310, a default value is inputted to a default I/O port PS (such as a 73h port of a south bridge) according to a function ID instruction $I_f$ under the operation of a call-back function. The function ID instruction $I_f$ comprises a first function ID value $I_1$ and a second function ID value $I_2$. The default I/O port PS is pre-set for a system management mode (SMM).

The SMM mode is entered when a default value is inputted to the default I/O port PS. The default value is any appropriate input value. Afterwards, the method proceeds to step 320, under the SMM mode, the address value $I_d$ corresponding to the first function ID value $I_1$ is inputted to a first index port PI1 (such as a 70h port) of the south bridge. A memory access corresponding to the second function ID value $I_2$ is performed on a first data port PD1 (such as a 71h port) of the south bridge according to the address value $I_d$. That is, the address of the memory corresponding to the address value $I_d$ is accessed according to the second function ID value $I_2$. For example, if the second function ID value $I_2$ corresponds to the writing of data, then data is written to the address of the memory corresponding to the address value $I_d$.

Second Embodiment

The memory access method of the second embodiment of the invention differs with that of the first embodiment in that the computer system of the second embodiment includes a general purpose register $R_u$ and a south bridge which includes a first index port PI1, a second index port PI2, a first data port PD1 and a second data port PD2. The first index port PI1 and the first data port PD1 are respectively similar to the first index port and the first data port of the first embodiment. The second index port PI2 and the second data port PD2 are pre-set for entering an SMM mode. For example, the 72h port of the south bridge is set to be the second index port PI2; the 73h port of the south bridge is set to be the second data port PD2. The SMM mode is entered when a default value is inputted to either the second index port PI2 or the second data port PD2. The default value is any appropriate input value.

Figure 4:
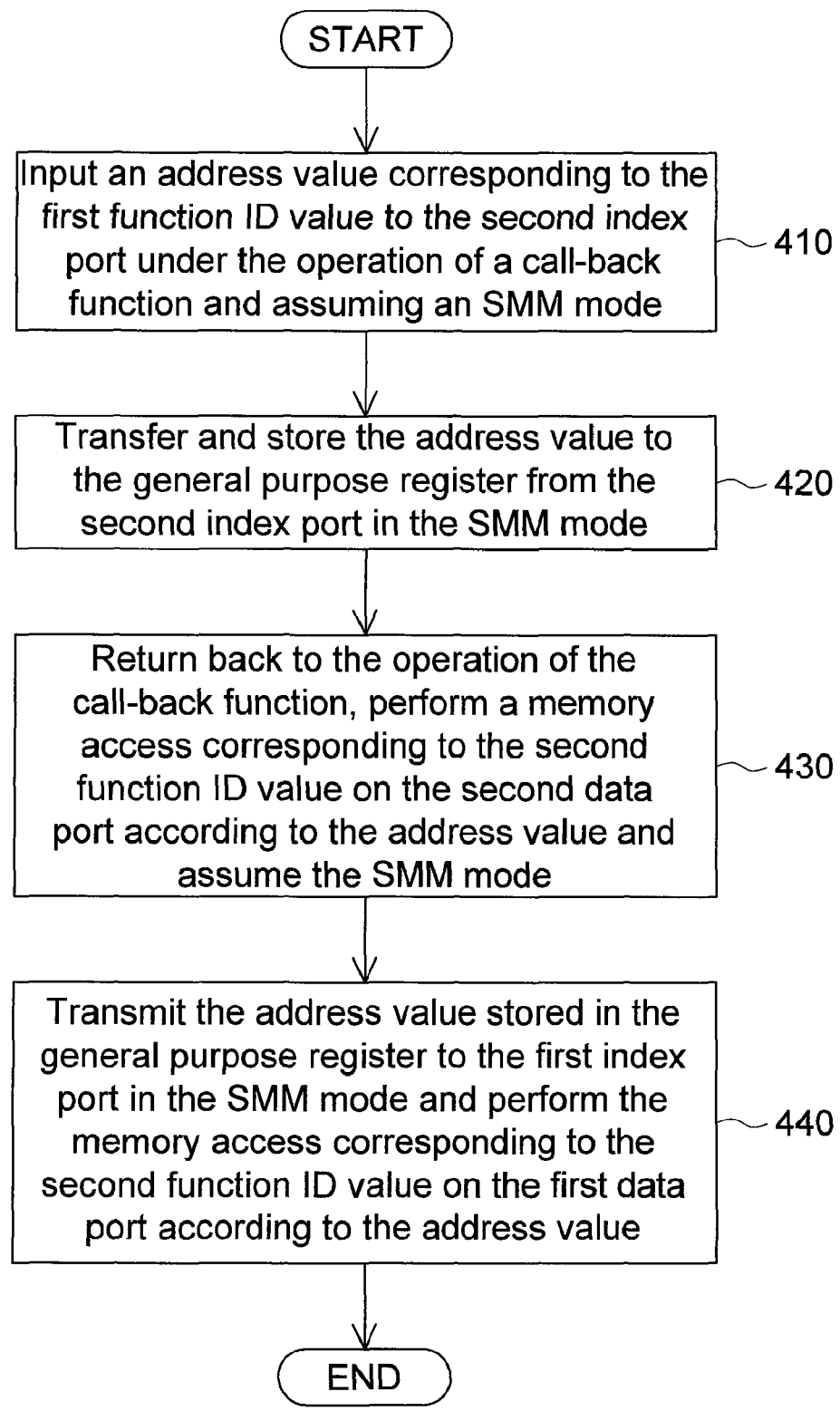
FIG. 4 is a flowchart of a memory access method according to a second embodiment of the invention.

FIG. 4 is a flowchart of a memory access method according to a second embodiment of the invention. The method begins at step 410, under the operation of a call-back function, an address value $I_d$ corresponding to the first function ID value $I_1$ is inputted to the second index port PI2. Thus, the SMM mode is entered. Next, the method proceeds to step 420, the address value $I_d$ is stored to the general purpose register $R_u$ under the SMM mode. Afterwards, the method proceeds to step 430, the operation of the call-back function is reentered. A memory access corresponding to the second function ID value $I_2$ is performed on the second data port PD2 according to the address value $I_d$, then the SMM mode is entered. Lastly, the method proceeds to step 440, the address value $I_d$ stored in the general purpose register $R_u$ is transmitted to the first index port PI1 under the SMM mode, and a memory access corresponding to the address value $I_d$ is performed on the first data port PD1 according to the second function ID value $I_2$.

Figure 5:
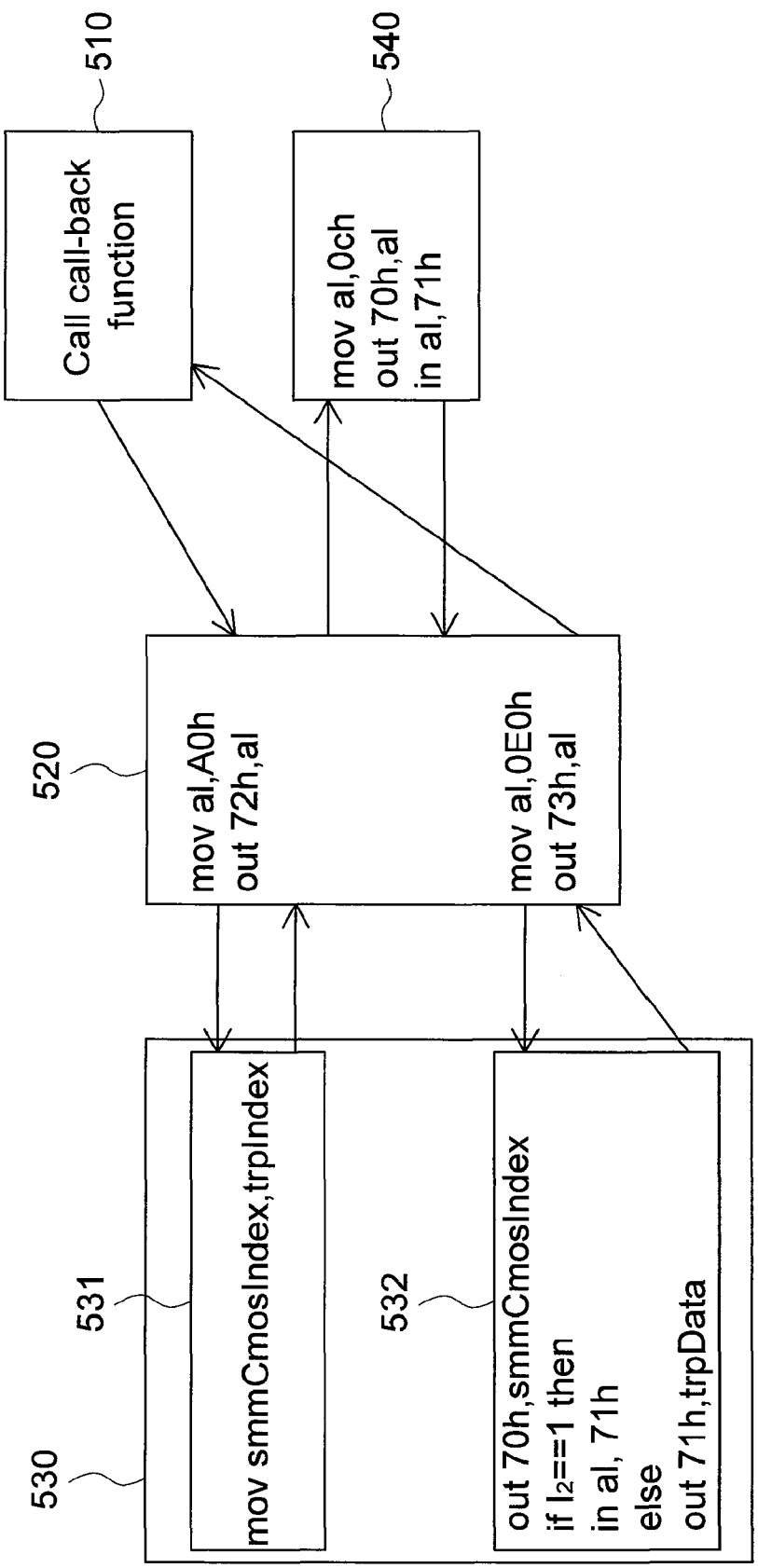
FIG. 5 is a perspective of a memory access method according to a second embodiment of the invention.

FIG. 5 is a perspective of a memory access method according to a second embodiment of the invention. The blocks 510, 520, 530 and 540 are respectively instructions for a VGA software, a call-back function, an SMM mode and an interrupt handler. In FIG. 5, the first index port PI1, the first data port PD1, the second index port PI2 and the second data port PD2 are respectively exemplified by a 70h port, a 71h port, a 72h port and a 73h port of a south bridge.

In block 510, the VGA software calls a call-back function. In block 520, an address value $I_d$ corresponding to the first function ID value $I_1$ is inputted to the second index port 72h under the operation of the call-back function, so as to enter the SMM mode. For example, the address value $I_d$ is A0h; the address value A0h corresponds to the address of the memory where the frame buffer size is stored in.

The block 530 includes a block 531 and a block 532. The instruction of the block 531 is performed when the address value A0h is inputted to the second index port 72h. In block 531, the address value A0h is stored in the general purpose register $R_u$, then the call-back function of the block 520 is reentered. In block 531, the address value is denoted by trapIndex, and the general purpose register is denoted by smmCmosIndex.

Afterwards, an interrupt occurs under the operation of the call-back function. In the block 540, the interrupt handler of the interrupt accidentally alters the address value corresponding to the first index port 70h as an erroneous address value 0ch which corresponds to an erroneous address of the memory. Afterwards, the interrupt terminates, and the operation of the call-back function of block 530 is reentered. When the call-back function inputs a data 0E0h to the second data port 73h, the SMM mode is entered and the instructions of block 532 are performed.

In block 532, the address value A0h stored in the general purpose register smmCmosIndex is transmitted to the first index port 70h, and the memory is accessed according to the address value A0h via the first data port 71h. In the present example, when the second function ID value $I_2$ is 1, the data in the address of the memory corresponding to the address value A0h is accessed. When the second function ID value $I_2$ is not 1 (for example, is 2), the data 0E0h is written to the address of the memory corresponding to the address value A0h. In block 532, data 0E0h is denoted by trpData. After accessing the memory, the operation of the VGA software is reentered.

According to the above disclosure, when an interrupt occurs during the operation of the call-back function, the interrupt handler alters the address value corresponding to the first index port 70h. However, as the correct address value A0h is stored in the general purpose register smmCmosIndex, the method still can access the address corresponding to the address value A0h stored in the general purpose register smmCmosIndex and will not erroneously access the address corresponding to erroneous address value 0ch.

Under the operation of the call-back function of step 330, no matter how the data corresponding to the first index port PI1 is altered by the interrupt handler, the memory access method of the invention still can access the memory correctly. In comparison, if the conventional memory access method is applied, once the data corresponding to the first index port PI1 is altered by the interrupt handler, data will be erroneously accessed from erroneous address of the memory.

Besides, the step performed in the SMM mode has highest priority, so there is no interrupt in the SMM mode. Therefore, in step 320, the address value $I_d$ is stored in the general purpose register under the protection of the SMM mode. Similarly, in step 340, the access of memory is also performed in the SMM mode, hence protected.

Therefore, the memory access method of the invention prevents negative effects caused by the interrupt handler, hence data is correctly accessed from the memory.

Third Embodiment

The memory access method of the invention can also be embodied in another way. The memory access method of the third embodiment of the invention differs with that in the first embodiment in that the south bridge of the computer system of the present embodiment of the invention includes an index port PI, a data port PD and a software system management interrupt (software SMI) port PM. The index port PI and the data port PD are respectively similar to the first index port and the first data port of the first embodiment. The software SMI port PM (such as the 402fh port) of a south bridge is for entering the SMM mode. The SMM mode is entered when a default value is inputted to the software SMI port PM.

Figure 6:
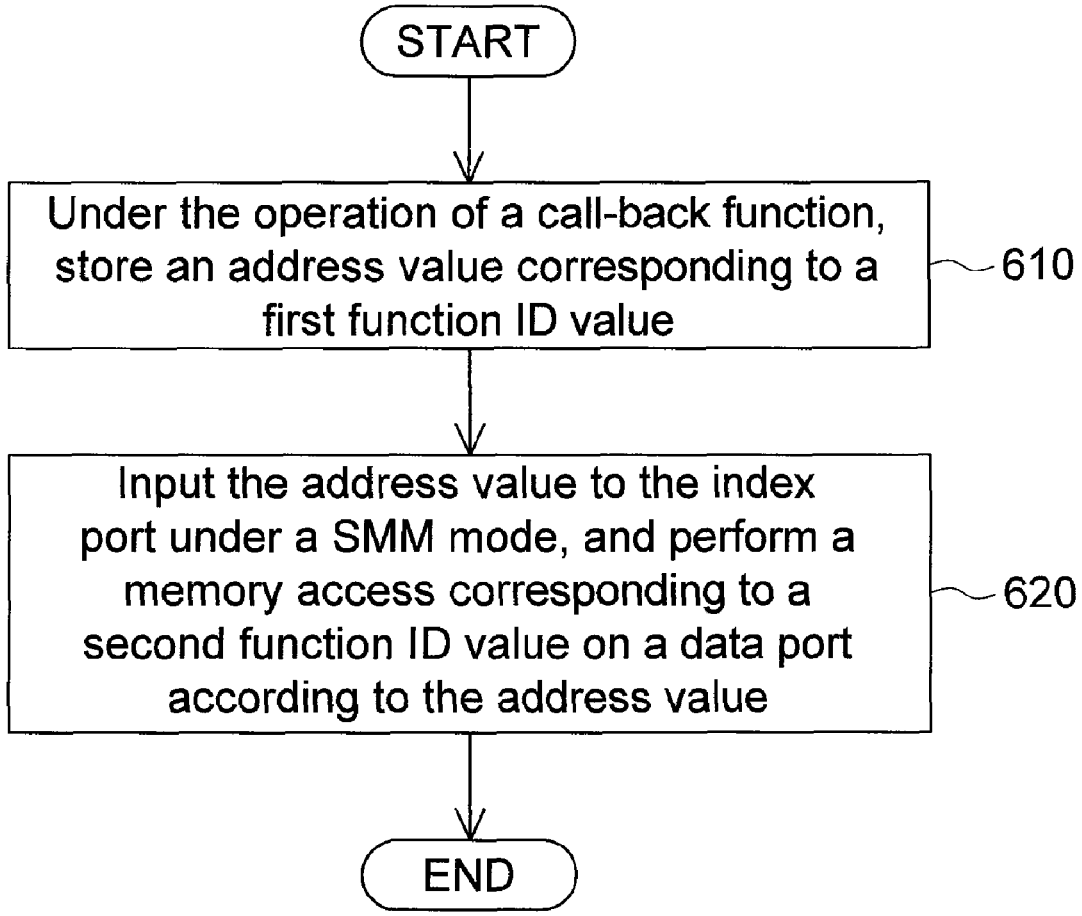
FIG. 6 is a flowchart of a memory access method according to a third embodiment of the invention.

FIG. 6 is a flowchart of a memory access method according to a third embodiment of the invention. Referring to FIG. 6, the method begins at step 610, under the operation of a call-back function, an address value $I_d$ corresponding to the first function ID value $I_1$ is stored. Meanwhile, a default value is inputted to the software SMI port PM according to the second function ID value $I_2$, and an SMM mode is entered. The default value is any appropriate input value. Next, the method proceeds to step 620. Under the SMM mode, the address value $I_d$ is inputted to the index port PI, and a memory access corresponding to the second function ID value $I_2$ is performed on the data port PD according to the address value $I_d$.

According to the memory access method disclosed in the above embodiments of the invention, memory access is performed in an SMM mode. When an interrupt occurs, despite the interrupt handler has altered any data of the index port or the I/O port capable of transmitting the address of memory, the address value corresponding to correct address is transmitted to the index port under the SMM mode, so that data is accessed from correct address of the memory.

While the invention have been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory access method for accessing a memory of a computer system according to a function ID instruction, wherein the function ID instruction comprises a first function ID value and a second function ID value, the computer system comprises a south bridge and a general purpose register, the south bridge has a first index port and a second index port, a first data port and a default I/O port, and the method comprises:
    (a) inputting an address value corresponding to the first function ID value to the second index port under the operation of a call-back function and entering an SMM mode;
    (b) in the SMM mode, transferring and storing the address value to the general purpose register from the second index port, exiting from the SMM mode and returning to the operation of the call-back function;
    (c) inputting a default value to the default I/O port according to the function ID instruction under the operation of the call-back function and entering the SMM mode; and
    (d) in the SMM mode, inputting the address value corresponding to the first function ID value to the first index port, meanwhile performing a memory access corresponding to the second function ID value on the first data port according to the address value.

2. The memory access method according to claim 1, wherein the step (d) further comprises:
    in the SMM mode, transmitting the address value stored in the general purpose register to the first index port, meanwhile, performing the memory access corresponding to the second function ID value on the first data port according to the address value.

3. The memory access method according to claim 1, wherein the second index port is an I/O port of the south bridge.

4. The memory access method according to claim 1, wherein step (c) further comprises:

storing the address value corresponding to the first function ID value under the operation of the call-back function, meanwhile, inputting the default value to the default I/O port according to the second function ID value of the function ID instruction and entering the SMM mode.

5. The memory access method according to claim 1, wherein the memory is a non-volatile memory in the south bridge of the computer system.

6. The memory access method according to claim 5, wherein the non-volatile memory of the computer system is a CMOS memory.

7. The memory access method according to claim 1, wherein all of the first index port, the first data port and the default I/O port are I/O ports of the south bridge.

8. A memory access method for accessing a memory of a computer system according to a function ID instruction, wherein the function ID instruction comprises a first function ID value and a second function ID value, the computer system comprises a general purpose register and a south bridge which comprises a first index port, a second index port, a first data port and a second data port, and the method comprises:
 (a) inputting an address value corresponding to the first function ID value to the second index port under the operation of a call-back function and entering an SMM mode;
 (b) transferring and storing the address value to the general purpose register from the second index port in the SMM mode;
 (c) exiting from the SMM mode and returning back to the operation of the call-back function if an interrupt occurs;
 (d) performing a memory access corresponding to the second function ID value on the second data port according to the address value and entering the SMM mode; and
 (e) in the SMM mode, transmitting the address value stored in the general purpose register to the first index port and performing the memory access corresponding to the second function ID value on the first data port according to the address value.

9. The memory access method according to claim 8, wherein all of the first index port, the first data port, the second index port and the second data port are an I/O port of the south bridge.

10. The memory access method according to claim 8, wherein the memory is a non-volatile memory in a south bridge of a computer system.

11. The memory access method according to claim 10, wherein the non-volatile memory of the computer system is a CMOS memory.

* * * * *